July 22, 1924.
P. DAIMLER
1,502,090
RUNNING GEAR FOR MOTOR CARS
Filed Aug. 7, 1920
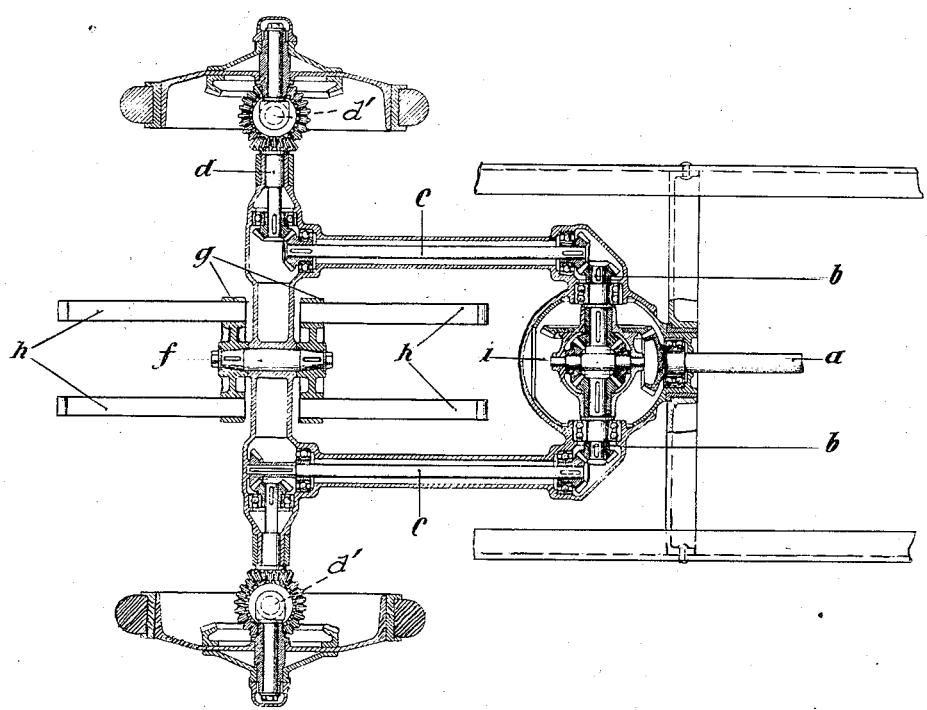
Witnesses:
Inventor:

Patented July 22, 1924.

1,502,090

UNITED STATES PATENT OFFICE.

PAUL DAIMLER, OF CANNSTATT, GERMANY, ASSIGNOR TO THE FIRM DAIMLER-MOTOREN-GESELLSCHAFT, OF UNTERTURKHEIM, GERMANY.

RUNNING GEAR FOR MOTOR CARS.

Application filed August 7, 1920. Serial No. 402,059.

(GRANTED UNDER THE PROVISIONS OF THE ACT OF MARCH 3, 1921, 41 STAT. L., 1313.)

*To all whom it may concern:*

Be it known that I, PAUL DAIMLER, a citizen of Wurttemberg, Germany, residing at Cannstatt, Waiblingerstr. 87, Wurttemberg, Germany, have invented certain new and useful Improvements in Running Gears for Motor Cars (for which I have filed applications in Germany, January 16, 1918; Austria, May 15, 1920; France, June 10, 1920; Italy, June 9, 1920; Czechoslovakia, May 27, 1920; and England, June 2, 1920), of which the following is a specification.

In the steering of autocars which are turned by swinging the knuckles carrying the steerable wheels, great flexibility can be obtained only with an arrangement which permits the wheels to be swung into positions very oblique to the normal direction of travel of the vehicle. In many types of autocars an abrupt turn of the steerable wheels is prevented by the springs of the car; in such cars the desired abrupt turning of said steerable wheels could be made possible by placing the springs very high above the axle in order to provide the necessary clearance for the steerable wheels. Such an arrangement is, however, not to be recommended, because when the springs are placed over the horizontal plane of the axle, said springs are subjected to undesirable stresses due to the push which comes from the axle when the wheels are swung to an oblique position. The strain on the springs is least when they are located in the horizontal plane of the axle.

The object of the invention is to provide an arrangement in which the springs are thus favorably located and in which at the same time the steerable wheels may be swung to a maximum extent.

This is accomplished by mounting the spring supports on pivots extending crosswise to the axle and lying in the horizontal plane of the same so that the springs, being fixed in the supports, are situated approximately in the plane of the axle. The steerable wheels may be driven from two longitudinal shafts lying in the direction of the length of the car.

These longitudinal shafts are rotated by short cross shafts which are in turn rotated by the central driving shaft of the car. The cross and longitudinal shafts are enclosed in casings which form a structural unit, suspended on a common support comprising what may be termed a universal joint.

A manner of carrying out the invention is illustrated in the drawing, which illustrates a sectional plan view of a portion of a motor vehicle equipped with the improvements.

The rotary motion of the central driving shaft $a$ is transmitted to two longitudinal shafts $c$ by short cross shafts $b$. The longitudinal shafts $c$ drive the front wheels by means of cross shafts $d$, said front wheels being rotatably mounted upon customary steering knuckles pivotally connected at $d'$ with the housing in which the shafts are located. At a point between the casings, which enclose the two longitudinal shafts $c$, a pivot $f$ extends transversely through and is fixed to the centre of the housing for the front wheel shafts $d$. Spring supports $g$ are mounted upon the opposite projecting ends of the pivot $f$, four springs $h$ being fixed to said supports and each having the shape of a quarter of an ellipse and being situated approximately at the same level as the housing for the front wheel shafts $d$.

As the spring supports $g$ are mounted on the pivot $f$, the housing for the front wheel shafts $d$ is capable of swinging in a vertical plane and of assuming an oblique position.

The casings of the longitudinal shafts $c$ are joined to the casings of the cross shafts $b$ and form with them a structural unit which is suspended at $i$ on the frame.

I claim:—

1. In a motor vehicle, the combination of a frame, a housing, a pivot on said housing extending in the longitudinal direction of the vehicle, vehicle springs, spring supports carrying said vehicle springs and mounted upon said pivot so as to rock in vertical planes transversely to the axis of said pivot, steerable wheels, means whereby said wheels are pivotally mounted upon said housing, and longitudinal driving shafts operatively connected with said wheels and located close to both sides of said spring supports.

2. In a motor vehicle, the combination of a frame, a housing, a pivot on said housing extending in the longitudinal direction of the vehicle, vehicle springs, spring supports carrying said vehicle springs and mounted upon said pivot so as to rock in vertical planes extending transversely to the axis of said pivot, steerable wheels mounted upon said housing, longitudinal driving shafts operatively connected with said wheels and located close to both sides of said spring supports, cross-shafts operatively connected with the longitudinal driving shafts, casings enclosing said longitudinal shafts, said casings being joined with said housing so as to form a structural unit and a universal joint connecting the structural unit to the vehicle frame.

3. In a motor vehicle, the combination of a frame, a housing, a pivot on said housing extending in the longitudinal direction of the vehicle, spring supports mounted upon said pivot so as to rock in vertical planes transversely to the axis of said pivot, vehicle springs connected with said spring supports and being located in relatively close parallel relation thereto in approximately the horizontal plane of the driving axis, steerable wheels mounted upon said housing and longitudinal driving shafts operatively connected with said wheels and located in close proximity to said springs upon opposite sides thereof.

4. In a motor vehicle, the combination of a frame, a housing, a pivot extending transversely through and beyond said housing in the direction of the length of said vehicle, spring supports pivotally mounted upon the projecting ends of said pivot member upon opposite sides of said housing, vehicle springs connected with said spring supports and located approximately in the horizontal plane of the driving axis, steerable wheels mounted upon said housing and longitudinal driving shafts operatively connected with said wheels and located in close proximity to said springs upon opposite sides thereof.

In testimony whereof I affix my signature in presence of two witnesses.

PAUL DAIMLER.

Witnesses:
  WALTER LUMENDSPYER,
  JORDAN BAUER.